United States Patent [19]

Chace

[11] Patent Number: 4,612,439

[45] Date of Patent: Sep. 16, 1986

[54] METHOD AND APPARATUS FOR NATURAL GAMMA RAY WELL LOGGING

[75] Inventor: David M. Chace, Houston, Tex.

[73] Assignee: Dresser Industries, Inc., Dallas, Tex.

[21] Appl. No.: 581,637

[22] Filed: Feb. 21, 1984

[51] Int. Cl.$^4$ .............................................. G01V 5/06
[52] U.S. Cl. ..................................... 250/256; 250/262
[58] Field of Search ......................... 250/256, 262, 253

[56] References Cited

U.S. PATENT DOCUMENTS

| | | | |
|---|---|---|---|
| Re. 31,122 | 1/1983 | Fertl et al. | 166/254 |
| 3,105,149 | 9/1963 | Guitton et al. | 250/369 |
| 3,336,476 | 8/1967 | Richardson | 250/256 |
| 3,940,610 | 2/1976 | Dennis et al. | 250/253 |
| 3,976,878 | 8/1976 | Chevalier et al. | 250/253 |
| 4,071,755 | 1/1978 | Supernaw et al. | 250/253 |
| 4,096,385 | 6/1978 | Marett | 250/262 |
| 4,271,356 | 6/1981 | Groeschel et al. | 250/262 |
| 4,542,292 | 9/1985 | Ellis | 250/256 |

FOREIGN PATENT DOCUMENTS 2117901 10/1983 United Kingdom ................ 250/256

OTHER PUBLICATIONS

Ronald Doig, "The Natural Gamma-Ray Flux: In Situ Analysis," *Geophysics*, vol. 33, No. 2 (Apr., 1968), p. 311–328.

*Primary Examiner*—Alfred E. Smith
*Assistant Examiner*—Constantine Hannaher
*Attorney, Agent, or Firm*—Patrick H. McCollum

[57] ABSTRACT

Method and apparatus for evaluating subsurface formations utilizing natural gamma radiation spectral measurements. The total counts measurement is processed to derive measurements relating to the concentrations of potassium-40, uranium and thorium. A relative concentration factor of uranium to the energy spectra is derived and the total counts measurement is compensated by the uranium factor to remove the effects of uranium.

15 Claims, 5 Drawing Figures

METHOD AND APPARATUS FOR NATURAL GAMMA RAY WELL LOGGING

BACKGROUND OF THE INVENTION

This invention relates generally to radioactivity well logging and, more particularly, to methods and apparatus utilizing natural gamma ray well logging for evaluating subsurface earth formations.

Various models and apparatus have been utilized in the art of well logging to study the radioactive properties of subsurface formations, both where the radioactivity is natural and where it is artifically induced. In general, one such method and apparatus, when applied to the field of natural gamma ray well logging, has utilized channels of spectra including those of potassium-40, uranium and thorium. One such technique utilizes these natural gamma ray logs to determine characteristics of shale formations as described in U.S. Pat. No. 4,071,755, issued Jan. 31, 1978 to Supernaw et al. Unfortunately, it can be difficult to differentiate such shale formations from other formations having relatively high concentrations of uranium, such as uranium-rich sands or formations exhibiting uranium oxide plating as a result of fluid movement.

Thus, the present invention provides methods and apparatus for evaluating subsurface formations to differentiate between shale formations and other formations having relatively high concentrations of uranium.

SUMMARY OF THE INVENTION

The present invention provides methods and apparatus for evaluating subsurface formations utilizing natural gamma ray spectral logging. A high-resolution, gamma ray spectrometer incorporated in a well logging instrument traverses a borehole, whereby natural gamma radiation strikes a scintillation crystal contained therein. The detected gamma rays striking the crystal cause the crystal to emit photons in the visible energy region, the intensity of which is proportional to the energy lost in the crystal by the incident gamma ray. Light energy from the crystal is optically coupled to a photomultiplier tube where the energy is converted to a proportional electrical pulse signal which is amplified and transmitted to processing circuitry.

Upon receipt of the pulses in the processing circuitry, the pulses are passed through a multi-channel analyzer where the pulses are sorted according to amplitude. The channels of the analyzer are selected to pass pulses representative of gamma radiation relating to potassium, uranium, thorium and the total spectrum count rate. The individual channel count rates are coupled into count rate meters, each of which counts the total number of pulses representing the detected gamma rays in an associated channel or energy band. The output from each count rate meter is coupled into a spectrum stripper where the effects of uranium and thorium are removed from the potassium signal and the effects of thorium are removed from the uranium signal.

The total count rate signal, the stripped potassium and uranium count rate signals and the thorium count rate signal are coupled into a processor where the relative contribution of uranium to the combined signals of potassium, uranium and thorium is determined. This uranium factor is applied to the total count rate measurement to provide a uranium compensated measurement. The total count rate, the uranium compensated measurement and the potassium, uranium and thorium measurements can be recorded to aid in the evaluation of the subsurface formations.

These and other features and advantages of the present invention can be understood from the following description of several techniques of practicing the invention described in conjunction with the following drawings.

DETAILED DESCRIPTION OF A PREFERRED EMBODIMENT

Figure 1:
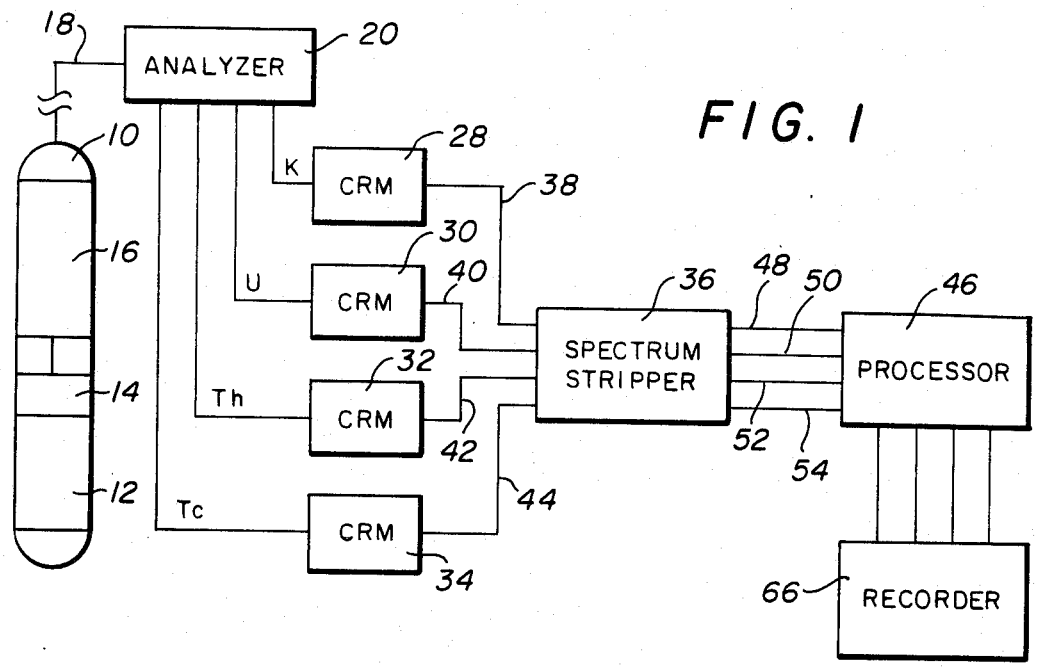
FIG. 1 is a simplified block diagram of an apparatus for performing the well logging techniques of the present invention.

Referring now to the drawings, particularly to FIG. 1, there is illustrated a well logging instrument 10 of the type used for traversing subsurface earth formations (not shown) to detect natural gamma radiation. Gamma rays are radiations originating within an atomic nucleus. A nucleus gives off excessive energy, gamma rays, as the result of radioactive decay or an induced nuclear reaction.

Radioactive decay consists of the emission or capture of elementary and composite particles with their consequent transformations into daughter nuclei characterized by different atomic numbers and in scme cases by different mass numbers. Of particular interest in formation evaluation are potassium, uranium and thorium. Both uranium and thorium consist of three isotopes. The only unstable isotope of potassium is the nuclide potassium-40.

Logging instrument 10 is illustrated to include a high-resolution gamma ray spectrometer consisting of a relatively large cylindrical cesium-iodide, thallium-activated scintillation type detector 12 optically coupled to a photomultiplier tube 14. In operation, crystal 12 gives off a quanta of light energy, called a photon, the intensity of which is proportional to the energy of the gamma ray interaction in the crystal. The photomultiplier responds to these photons to produce a succession of electrical pulses having magnitudes proportional to the energy of the gamma rays impinging upon the crystal. The pulses are amplified in subsurface electronics 16 and transmitted to the surface over electrical conductors in cable 18.

Figure 2:
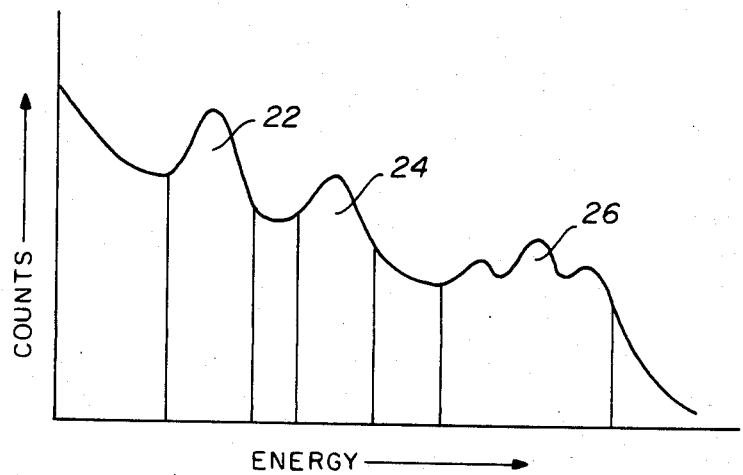
FIG. 2 graphically illustrates a natural gamma radiation spectrum as measured by the apparatus of FIG. 1.

The amplified pulses, representative of the energy of the detected gamma radiation, are coupled into a multi-channel analyzer 20 which sorts gamma radiation as a function of energy levels. As illustrated in FIG. 2, analyzer 20 separates these pulses into at least three channels or energy bands representative of potassium, uranium and thorium, 24, 25, and 26 respectively. Additionally, a fourth channel containing the total measured spectrum is provided. Hence, in addition to total gamma ray counts, the logging system measures gamma rays representative of 1.46 MeV, the uranium series nuclide bismuth-214 emanating gamma radiation at 1.76 MeV and the thorium series nuclide thallium-208 emanating gamma rays at 2.614 MeV. In the preferred embodiment, the potassium energy band, 22, is from between 1.31 MeV and 1.57 MeV, the uranium energy band 26 is from between 1.61 MeV and 1.95 MeV and the thorium energy band 26 is from between 2.41 MeV and 2.93 MeV.

Returning to FIG. 1, the output from the potassium energy band is coupled into count rate meter 28, the output from the uranium energy band is coupled into count rate meter 30, the output from the thorium energy band is coupled into count rate meter 32 and the output from the total measured spectrum is coupled into count rate meter 34. Each count rate meter, 28, 30 and 32, accumulates counts characteristic of the particular radioactive element associated therewith, with count rate meter 34 accumulating the total number of gamma rays detected.

Unfortunately, some deterioration will occur in the energy level of radiation emitted by an element contained in the subsurface formations, so that, when measured, radiation from an element belonging in a higher energy range may exhibit a pulse height which would place it in a lower energy range. Spectrum stripping refers to the process whereby background count rates are electronically subtracted in a mathematical process. To perform spectrum stripping the outputs of count rate meters 28, 30, 32 and 34 are coupled into spectrum stripper 36 over electrical conductors 38, 40, 42 and 44, respectively.

As a result of having the highest energy level, the thorium count rate is not stripped and may be used for further processing or forming a log directly. Thus traditionally the stripping is only necessary for the potassium and uranium channels as a result of the addition therein of energy degraded thorium gamma rays and, in the case of the potassium channel degraded uranium gamma rays. Count rates in the potassium and uranium channels that are obtained solely from energy degraded thorium gamma rays are subtracted. A similar procedure of removing energy degraded uranium gamma rays from the potassium channel count rate is also performed. In this way, accurate concentrations of potassium, uranium and thorium are determined. One method of performing spectrum stripping is described in detail in U.S. Pat. No. 4,271,356 issued to Groeschel et al, and assigned to the assignee of the present invention, which is incorporated herein by reference.

Figure 3:
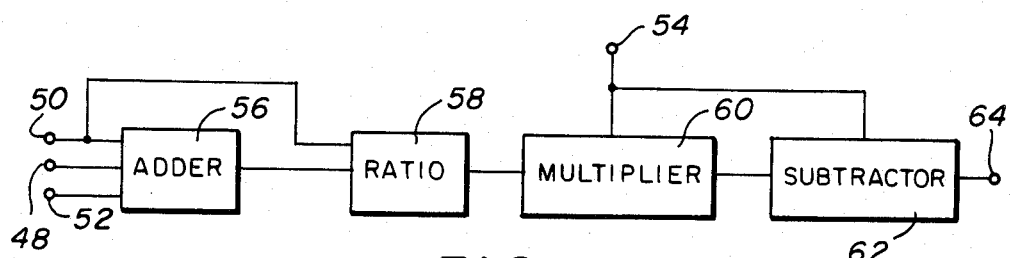
FIG. 3 is a circuit block diagram of a portion of the surface electronics utilized in accordance with the present invention.

The potassium signal output is coupled from spectrum stripper 36 into processor 46 on electrical conductor 48. The uranium signal output is coupled into processor 46 on conductor 50. The thorium signal output is coupled into processor 46 on conductor 52 and the total count signal is coupled in processor 46 on conductor 54. Referring now to FIG. 3, there is illustrated a portion of the electronic circuitry, in block form, of processor 46. Adder circuit 56 has inputs from the stripped uranium signal, conductor 50, the stripped potassium signal, conductor 48 and the thorium signal, conductor 52. These three inputs are summed in adder curcuit 56 and the output signal coupled into ratio circuit 58. The second input into ratio circuit 58 is the stripped uranium signal. The stripped uranium signal is divided by the output of adder circuit 56 and the output is coupled into multiplier circuit 60, a second input of which is the total counts signal on conductor 54. The output of multiplier circuit 60 is coupled into subtractor circuit 62 where it is subtracted from the total counts signal. The output 64 of subtractor circuit 62 is the uranium corrected total counts signal.

The operation of the circuitry of FIG. 3 can be expressed mathmatically. The fractional contribution of uranium to the selected energy bands can be expressed by the relationship:

$$U_f = \frac{U}{K + U + Th} \quad (1)$$

where U is the stripped uranium count rate, K is the stripped potassium count rate and Th is the thorium count rate. The sum of these three signals is the output of adder circuit 56 and the relative uranium contribution $U_f$ is the output of ratio circuit 58. The total count signal is then corrected to compensate for the fractional contribution of uranium thereto as expressed by the relationship:

$$TC_c = TC - U_f(TC) \quad (2)$$

where the corrected total counts signal is output 64 of subtractor circuit 62.

The total counts along with the uranium compensated total counts, the stripped potassium and uranium signals, and the thorium signal are coupled from processor 46 to recorder 66. Recorder 66 can be of any suitable type commonly used in the art, such as magnetic tape or a film recorder.

Figure 4:
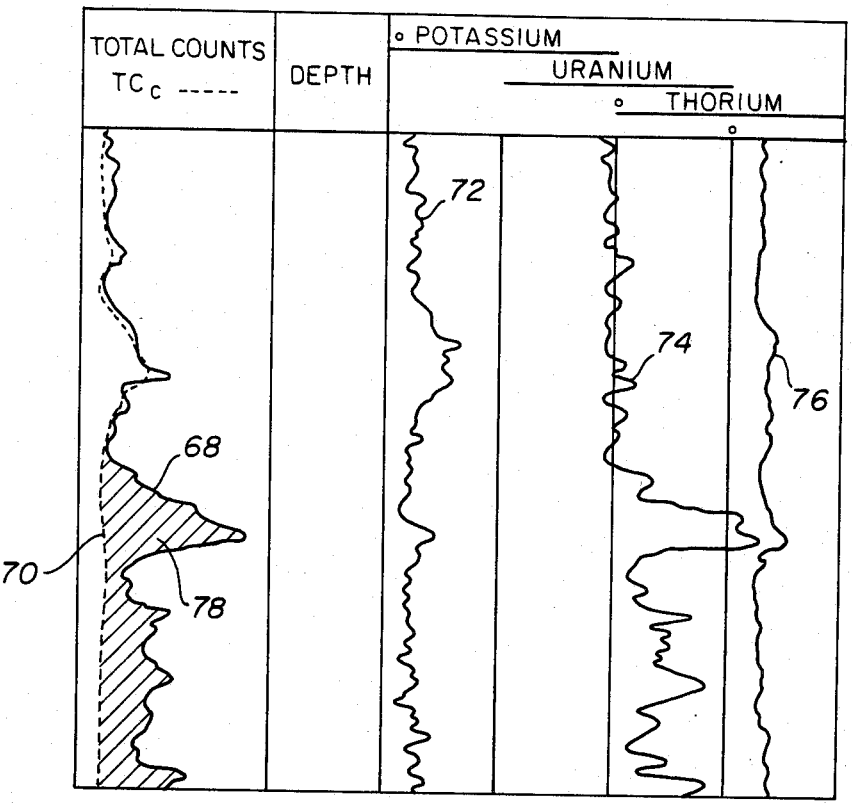
FIG. 4 is a pictorial representation of a section of a well log produced by the apparatus of FIG. 1.
Figure 5:
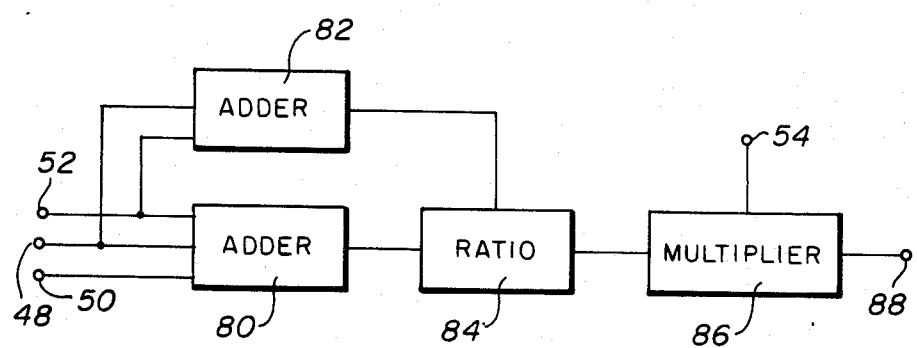
FIG. 5 is a circuit block diagram of a portion of the surface electronics utilized in accordance with an alternate embodiment of the invention.

A visual representation of the log as developed by the apparatus of FIG. 1 is illustrated in FIG. 4. As shown on the log, the signals developed are depicted in graphical form of a total counts curve 68, a uranium compensated total counts curve 70 (dashed line), a potassium counts line 72, a uranium counts line 74, and a thorium counts line 76. By comparison of the total counts line 68 and the uranium compensated total counts line 70 it is easily recognized that formation zone 78 (crosshatched) is not a shale zone as indicated by the total counts curve activity alone but rather a uranium rich sand zone as indicated by the uranium compensated total counts curve and, therefore, a potential hydrocarbon producing zone. Referring now to FIG. 5 there is illustrated an alternate embodiment for deriving a uranium compensated total counts measurement. Adder circuit 80 has three inputs, a stripped potassium signal 48, a stripped uranium signal 50 and a thorium signal 52. A second adder circuit 82 has inputs representing the stripped potassium signal 48 and the thorium signal 52. The outputs from adder circuit 80 and adder circuit 82 are coupled into ratio circuit 84 where the output from adder circuit 82 is divided by the output from adder circuit 80. The output from ratio circuit 84 is coupled into multiplier circuit 86 where it is multiplied by the total counts signal 54. The output 88 of multiplier circuit 86 represents the uranium compensated total counts signal. The operation of the circuitry of FIG. 5 is expressed by the relationship:

$$TC_c = \left( \frac{K + Th}{K + U + Th} \right) TC \quad (3)$$

Accordingly, while particular embodiments of the present invention have been illustrated and described, it will be apparent to those skilled in the art that changes and modifications may be made without departing from the invention in its broad aspects.

The embodiments of the invention in which an exclusive property or privelege is claimed are defined as follows:

1. A method for determining characteristics of subsurface earth formations said method including compensating natural gamma radiation signals for the effects of uranium, comprising the steps of:
    detecting natural gamma radiations emanating from said earth formations;
    generating an energy spectra signal functionally related to the energy and frequency of occurrence of said detected radiations;
    determining a compensation factor functionally related to the relative contribution of uranium to said energy spectra signal; and
    compensating said energy spectra signal using said compensation factor to remove substantially all the effects of uranium.

2. The method for determining characteristics of subsurface earth formations of claim 1 wherein said step of determining said compensation factor further comprising the steps of:
    generating from said energy spectra signal separate signals functionally related to radiations representative of potassium, uranium and thorium;
    generating said compensation factor using said signals representative of potassium, uranium and thorium.

3. The method for determining characteristics of subsurface earth formations of claim 2 wherein said step of generating said compensation factor using said signals representative of potassium, uranium and thorium is in accordance with the relationship:

$$U_f = \frac{U}{K + U + Th}.$$

4. The method for determining characteristics of subsurface earth formations of claim 2 wherein said step of generating said compensation factor using said signals representative of potassium, uranium and thorium is in accordance with the relationship:

$$U_f = \frac{K + Th}{K + U + Th}.$$

5. The method for determining characteristics of subsurface earth formations of claim 2 further comprising the step of comparing said energy spectra signal and said compensated energy spectra signal.

6. A method for determining characteristics of subsurface earth formations said method including compensating natural gamma radiation signals for the effects of uranium, comprising the steps of:
    detecting natural gamma radiation emanating from said earth formations;
    generating a first electrical signal functionally related to the energy and frequency of occurrence of said detected radiation;
    separating said first electrical signal into energy regions characteristic of radiations representative of potassium, uranium and thorium;
    generating second, third and fourth electrical signals functionally related to radiations within said energy regions characteristic of potassium, uranium and thorium, respectively;
    deriving a fifth electrical signal as a uranium concentration factor based on said second, third, and fourth electrical signals; and
    compensating said first electrical signal using said fifth electrical signal to remove the effects of uranium.

7. The method for determining characteristics of subsurface earth formations of claim 6 further comprising the step of comparing said first electrical signal and said compensated electrical signal.

8. The method for determining characteristics of subsurface earth formations of claim 7 wherein separating said first electrical signal into energy regions characteristic of potassium, uranium and thorium comprises the steps of:
    measuring said radiation within the energy region from between approximately 1.31 MeV and approximately 1.57 MeV as characteristic of potassium;
    measuring said radiation within the energy region from between approximately 1.61 MeV and approximately 1.95 MeV as characteristic of uranium; and
    measuring said radiation within the energy region from between approximately 2.41 MeV and approximately 2.93 MeV as characteristic of thorium.

9. The method for determining characteristics of subsurface earth formations of claim 8 wherein deriving a uranium concentration factor is in accordance with the relationship:

$$U_f = \frac{U}{K + U + Th}.$$

10. The method for determining characteristics of subsurface earth formations of claim 9 wherein compensating said first electrical signal is in accordance with the relationship:

$$TC_c = TC - U_f(TC)$$

where TC is said first electrical signal.

11. The method for determining characteristics of subsurface earth formations off claim 8 wherein deriving a uranium concentration factor is in accordance with the relationship:

$$U_f = \frac{K + Th}{K + U + Th}.$$

12. The method for determining a characteristics of subsurface earth formations of claim 11 wherein compensating said first electrical signal is in accordance with the relationship:

$$TC_c = U_f(TC)$$

where TC is said first electrical signal.

13. Apparatus for determining characteristics of subsurface earth formations by detecting natural gamma radiation signals and compensating said signals for the effects of uranium, comprising:
    means for detecting natural gamma radiations emanating from said earth formations;
    means for generating an energy spectra signal functionally related to the energy and frequency of occurrence of said detected radiations;

means for generating a correction factor functionally related to the relative contribution of uranium to said energy spectra signal; and means for compensating said energy spectra signal using said correction factor to remove the effects of uranium.

14. The apparatus of claim 13 further comprising:

means for separating said energy spectra signal into energy regions characteristic of potassium, uranium and thorium;

means for generating electrical signals functionally related to said energy regions; and means for generating said correction factor using said electrical signals characteristic of potassium, uranium, and thorium.

15. The apparatus of claim 14 further comprising:

means for summing said electrical signals functionally related to potassium, uranium and thorium; and means for deriving the relative contribution of uranium to said summed signals.

* * * * *